(No Model.) 2 Sheets—Sheet 1.
H. W. GODFREY, C. F. LEAKE & C. E. LUCAS.
METHOD OF AND APPARATUS FOR MANUFACTURING FLOOR CLOTH.
No. 514,186. Patented Feb. 6, 1894.
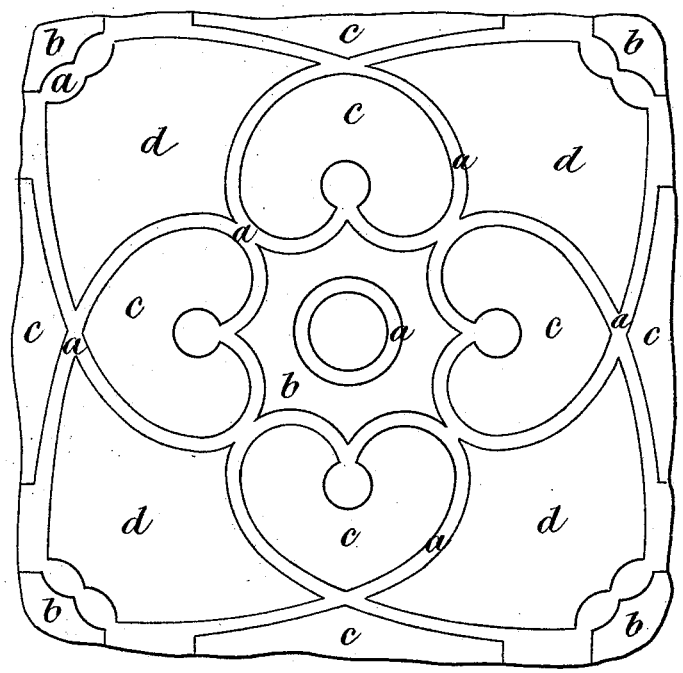
Fig. 1.
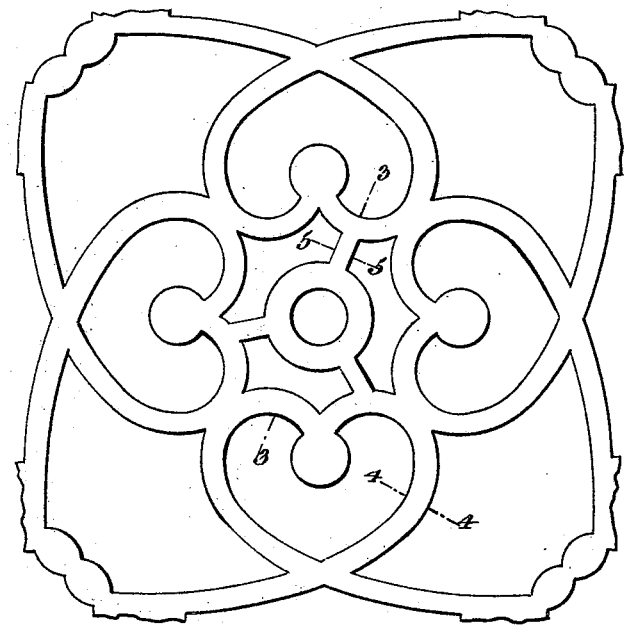
Fig. 2.
Witnesses
B. W. Miller
E. W. Brooks
Fig. 4.  Fig. 3.  Fig. 5
Inventors
Henry W. Godfrey,
Charles F. Leake, and
Charles E. Lucas.
By their Attorneys,
Balmoin Davidson Wight.
THE NATIONAL LITHOGRAPHING COMPANY,
WASHINGTON, D. C.

(No Model.) 2 Sheets—Sheet 2.
H. W. GODFREY, C. F. LEAKE & C. E. LUCAS.
METHOD OF AND APPARATUS FOR MANUFACTURING FLOOR CLOTH.
No. 514,186. Patented Feb. 6, 1894.
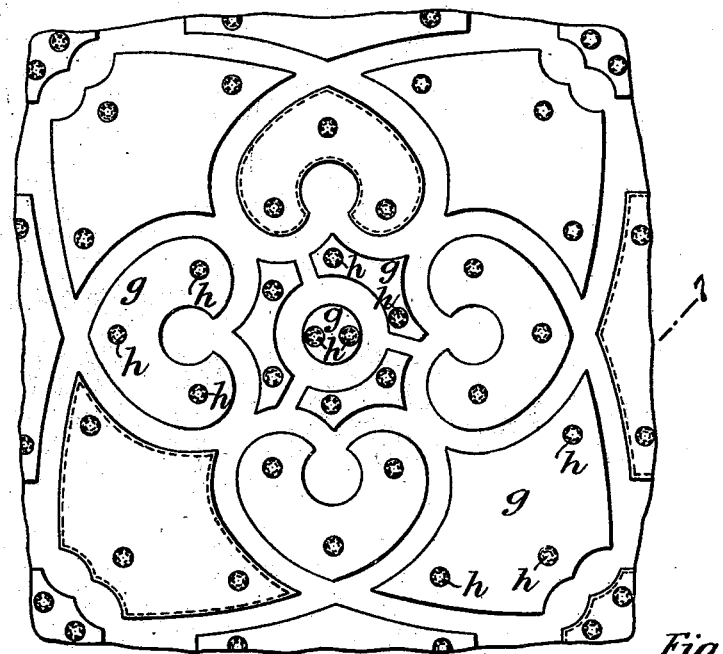
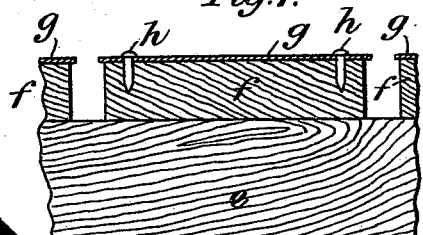
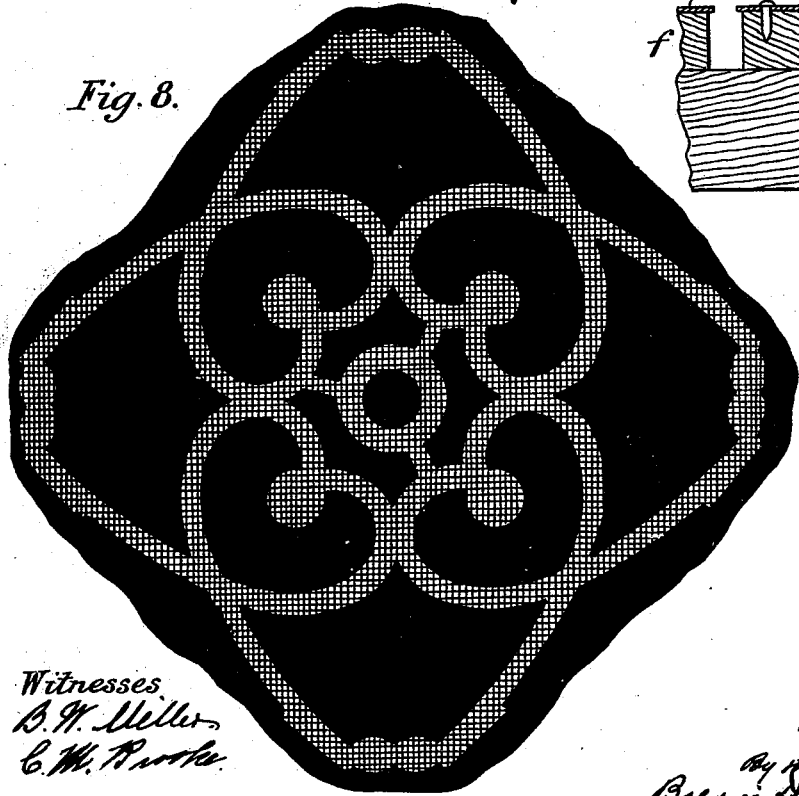
Witnesses
Inventors

UNITED STATES PATENT OFFICE,

HENRY WILLIAM GODFREY, CHARLES FREDERICK LEAKE, AND CHARLES EDWARD LUCAS, OF LONDON, ENGLAND.

METHOD OF AND APPARATUS FOR MANUFACTURING FLOOR-CLOTH.

SPECIFICATION forming part of Letters Patent No. 514,186, dated February 6, 1894.

Application filed November 20, 1893. Serial No. 491,420. (No model.) Patented in England November 2, 1892, No. 19,737.

*To all whom it may concern:*

Be it known that we, HENRY WILLIAM GODFREY and CHARLES FREDERICK LEAKE, engineers, and CHARLES EDWARD LUCAS, linoleum manufacturer, subjects of the Queen of Great Britain, residing at Staines, London, in the county of Middlesex, England, jointly have invented certain new and useful Improvements in Methods of and Apparatus for Manufacturing Floor-Cloth, (for which we have obtained Letters Patent in Great Britain, No. 19,737, dated November 2, 1892,) of which improvements the following is a specification.

The object of our invention is to produce a floor-cloth from granulated linoleum composition, in various colors, arranged according to a tesselated pattern, and with the tesseræ separated the one from the other by an intervening outline. It has been impracticable to produce such outlined tesseræ by the methods heretofore employed, in consequence of the difficulty encountered in causing granulated linoleum to penetrate between the tesseræ in the small quantities suitable to form an outline. We overcome this difficulty by arranging tesseræ in order upon a suitable carrying fabric, with narrow spaces between them; inserting granulated material of a contrasting color in these spaces to form the outline, and then consolidating the linoleum fabric by pressure.

The subject-matter claimed will be hereinafter specifically designated.

We will now proceed to describe the manner in which the manufacture of our improved linoleum is conducted, with reference to the apparatus employed by us therein, and to the accompanying drawings, in which—

Figure 1 represents such a floor-cloth pattern; Fig. 2, a plan of a portion of a grid, stencil-plate, or templet suitable for making the pattern shown in Fig. 1, and Figs. 3, 4, and 5 are respectively vertical cross-sections on the correspondingly marked lines of Fig. 2. Fig. 6 shows a bottom plan or under side view of a portion of a pressing-block used in forming the tesseræ, and Fig. 7, a vertical cross-section therethrough, on the line 7—7 of Fig. 6; and Fig. 8, a plan view of a portion of a stencil-plate sieve used in forming outlines.

In carrying out our invention, a metal grid, such as shown in Figs. 2, 3, 4, and 5, is prepared to correspond with the pattern of the floor-cloth to be made, Fig. 1 being an example of such a pattern. In this figure, *a* represents the outline, say in white, and *b*, *c*, and *d*, the tesseræ forming the pattern, may be of different colors arranged as indicated by the letters, *b* representing one color, *c*, another, and *d*, a third. This color is not simply on the surface, but extends through the fabric. Such floor-cloths have heretofore been produced, excepting that the tesseræ have not been outlined.

The openings in the grid represent the tesseræ, and the bars the outline. This grid is laid upon the carrying-fabric, and the cavities of the grid, which are about half an inch deep, are filled with granulated linoleum. The carrying-fabric is prepared in a well-known manner, so that the linoleum material may not adhere to it so firmly as to prevent a subsequent separation.

In filling the cavities of the grid, we employ metal plates like stencil-plates, which are laid over the grid. Three such plates are employed for the pattern shown in Fig. 1; the first being a plate with holes in it corresponding to the parts *b*, of the pattern, but otherwise complete.

Granulated linoleum of the required color, at a suitable temperature, and prepared in the usual way is laid on the plate and brushed through its holes into the exposed cavities of the grid, and the surplus is removed with a straight edge. Then the plate, with the surplus material upon it is removed from the grid, and replaced by another plate with holes corresponding with the parts *c*, of the pattern. The cavities of the grid now exposed are filled, as already described, with granulated linoleum of the second color. This plate is then removed, and a third one applied, treated, and removed in the same way, thus filling all the cavities of the grid except the outlines. A pressing-block such as shown in Figs. 6 and 7, is then laid upon the linoleum material thus patterned, and a moderate pressure applied thereto; the granulated linoleum being in an adhesive state, is consolidated and forms the tesseræ. The pressing-block has projections thereon, corresponding in shape with, and entering each of the respective cavities for this purpose. These projections are required, as will be seen, accurately to fit the cavities of the grid; and this we arrange for in the following manner. We make the pressing-block preferably with a wooden back e, having projections f thereon. These projections are somewhat smaller than the cavities, but each of them is provided with a sheet-metal cover or head g, which accurately fits these cavities, and is secured to the projections by fastenings or pins h. The holes in these sheet-metal heads through which the pins pass are elongated or made somewhat too large for the pins, so that a small amount of movement of the heads on the projections is possible. The edges of the grid-bars are tapered or removed (see Figs. 2, 3, and 4), slightly to enlarge the mouths of the cavities so that the metal heads will enter them even if they should not be presented with perfect accuracy to the grid, owing to warpage or other causes. Both the pressing-block and grid are then removed from the patterned material, and a sieve with a wire-gauze bottom applied. (See Fig. 8.) It has pieces of sheet-metal secured upon it corresponding in outline with the figures of the pattern, so as to stop out all the parts thereof excepting those corresponding to the outline to be inserted. This sieve might, in fact, otherwise be termed a perforated stencil plate, being indeed a stencil plate and sieve combined. By the use of this plate in a manner similar to that above indicated for the tesseræ plates, the spaces between the tesseræ left by the removal of the grid are filled with granulated linoleum of the contrasting color to be used for the outline. In doing this care is taken that the uncovered gauze is immediately over the spaces vacated by the bars of the grid. Granulated linoleum of the outlining color is placed in the sieve and is worked about lightly by the aid of a brush until enough has passed through the sieve to fill the vacant spaces, and to heap up in contact with the gauze, say an eighth of an inch above the level of the tesseræ. The sieve is then lifted off. Finally the patterned material is placed beneath a prepared backing of cloth, and the whole is further consolidated by hydraulic pressure between metal plates as usual. This pressure consolidates the linoleum equally throughout; and, as the tesseræ have previously been consolidated, to some extent, a narrowing of the outline results, and consequently, in the finished fabric, the outline is considerably narrower than the bars of the grid.

The carrying or sustaining fabric on which the pattern was originally formed is then removed from the face of the floor-cloth, and the article is finished.

Our above-described invention obviously is not limited merely to the production of an outlined pattern, but any pattern of which comparatively fine lines form a part may advantageously be produced in like manner.

What we claim herein as new and as of our joint invention is—

1. The hereinbefore described improvement in the art of manufacturing floor-cloths; which improvement consists in forming tesseræ of the required colors and pattern, of granulated material, such as linoleum, upon a supporting fabric, with intervening spaces or outlines; partially compressing such tesseræ; filling the intervening spaces or outlines with similar material of a contrasting color; applying a backing to the patterned material; consolidating the whole fabric by further pressure, and removing the original supporting fabric, substantially in the manner and for the purpose set forth.

2. The combination of a patterned grid provided with tapering ribs, and a pressing-block provided with projections covered by correspondingly patterned sheet-metal heads adapted to move slightly laterally in their fastenings, so as accurately to conform to the ribs; the combination being and operating substantially as and for the purpose set forth.

HENRY WILLIAM GODFREY.
    CHARLES FREDERICK LEAKE.
    CHARLES EDWARD LUCAS.

Witnesses to the signatures of Henry William Godfrey and Charles Edward Lucas:
    G. F. WARREN,
*Notary Public, London.*
    THOMAS LAKE,
17 *Gracechurch Street, London, Notary's Clerk.*

Witnesses to the signature of Charles Frederick Leake:
    DEANSTON CARPMAEL,
    JOHN H. WHITEHEAD,
*Both of 24 Southampton Bdgs., London, W. C.*